US011624045B2

(12) United States Patent
Zhulev

(10) Patent No.: US 11,624,045 B2
(45) Date of Patent: Apr. 11, 2023

(54) METHOD, APPARATUS AND UNIVERSAL CONTAINER FOR NATURAL CARBONATION OF BEVERAGES

(71) Applicant: Georgi Stoyanov Zhulev, Plovdiv (BG)

(72) Inventor: Georgi Stoyanov Zhulev, Plovdiv (BG)

(*) Notice: Subject to any disclaimer, the term of this patent is extended or adjusted under 35 U.S.C. 154(b) by 827 days.

(21) Appl. No.: 16/873,106

(22) PCT Filed: Jan. 19, 2018

(86) PCT No.: PCT/BG2018/000005
§ 371 (c)(1),
(2) Date: Jun. 1, 2020

(87) PCT Pub. No.: WO2018/137005
PCT Pub. Date: Aug. 2, 2018

(65) Prior Publication Data
US 2022/0002643 A1    Jan. 6, 2022

(30) Foreign Application Priority Data

Jan. 26, 2017  (BG) .......................................... 112447
Apr. 12, 2017  (BG) .......................................... 112486
Dec. 8, 2017   (BG) ............................................ 3922

(51) Int. Cl.
*C12G 1/06*   (2019.01)
*C12C 11/11*  (2019.01)
*A23L 2/54*   (2006.01)
*B67D 1/00*   (2006.01)
*B67D 1/08*   (2006.01)
*B67D 1/12*   (2006.01)
*C12C 13/00*  (2006.01)

(52) U.S. Cl.
CPC .................. *C12G 1/06* (2013.01); *A23L 2/54* (2013.01); *B67D 1/0075* (2013.01); *B67D 1/0076* (2013.01); *B67D 1/0804* (2013.01); *B67D 1/0871* (2013.01); *B67D 1/125* (2013.01); *C12C 11/11* (2013.01); *C12C 13/00* (2013.01)

(58) Field of Classification Search
CPC .. C12G 1/06; C12C 11/11; A23L 2/54; B67D 1/00; B67D 1/08; B67D 1/12
See application file for complete search history.

(56) References Cited

U.S. PATENT DOCUMENTS 4,343,824 A * 8/1982 Caldwell ............. B01F 23/2362
261/DIG. 7
4,399,744 A * 8/1983 Ogden ................ B01F 23/2362
261/DIG. 7

(Continued)

*Primary Examiner* — Anthony J Weier
(74) *Attorney, Agent, or Firm* — Inventa Capital PLC

(57) ABSTRACT

The present invention relates to a method, apparatus and universal container for natural carbonation of beverages, which will be used in the food industry, in particular in the production of beer, sparkling wines and carbonated fruit drinks. The method of naturally occurring carbonation of beverages involves the operations of feeding with fermenting substrate, adding water, adding yeast, fermenting the resulting liquid mixture. The fermentation is carried out in a specialized container at an optimum temperature of 8° C. to 23° C., depending on the yeast species. The fermentation process lasts for 3 to 4 days and is accompanied by an increase in container pressure to 2 bar.

10 Claims, 3 Drawing Sheets

(56) References Cited

U.S. PATENT DOCUMENTS

| | | | | |
|---|---|---|---|---|
| 4,929,452 A | * | 5/1990 | Hamdy | C12M 23/34 |
| | | | | 426/11 |
| 8,601,936 B2 | * | 12/2013 | Williams | C12C 13/10 |
| | | | | 426/11 |
| 2017/0342358 A1 | * | 11/2017 | Cheng | C12M 29/14 |

* cited by examiner

METHOD, APPARATUS AND UNIVERSAL CONTAINER FOR NATURAL CARBONATION OF BEVERAGES

FIELD OF THE INVENTION

The present invention relates to a method, apparatus and universal container for natural carbonation of beverages, which will be used in the food industry, in particular in the production of beer, sparkling wine and carbonated fruit beverages as well as for home use.

BACKGROUND OF THE INVENTION

Beer, also called ale, is the oldest and most consumed alcoholic drink in the world and the third most popular drink, after water and tea. It is produced by brewing and fermentation of starch, obtained mainly from cereals, and fermentation yeast helps for the fermentation. Beer is flavored with hops, which adds bitterness and acts as a natural preservative. Other flavors can also be added through herbs and fruits.

The basis of the brewing process is the conversion of starch from the source material into a sugar solution called wort, which in turn is converted into an alcoholic beer by fermentation carried out by the brewing yeast.

The wort is placed in the fermenter, where the brewing yeast is added to it. In the process of fermentation, wort is turned into beer, which takes from a week to months, depending on the type of yeast and the strength of the beer. After the fermentation is complete, the yeasts settle down, leaving the beer clear. Sometimes the fermentation takes place in two separate stages, primary and secondary. Once the majority of the alcohol is formed during the initial fermentation, the beer is transferred to a new container where secondary fermentation takes place. This is done when the beer has to be stored longer or a greater clarity is sought. Secondary fermentation of beer is carried out in other pressure equipment in order to saturate the beer with carbon dioxide, i.e. its carbonization under certain temperature and pressure conditions. Beer is filtered, and then bottled in glass or plastic bottles, aluminium cans, and more.

Practical methods for carbonation of non-alcoholic beverages are also known in the art, wherein the process of saturation of the beverage with carbon dioxide comprises deaeration reduction in the amount of oxygen in the beverage that is achieved by creating a vacuum in a closed container. Carbonization is followed by spraying water through carbon dioxide into the closed container under pressure.

The known methods for carbonation of beverages are technologically complicated and are carried out for a relatively longer period of time.

Cylindrical conical apparatus for beer producing is widely known in the art, which is a cylindrical body with a conical portion at one end made of acid and alkali resistant steel. The apparatus is provided with an insulating jacket and a temperature maintaining system including cooling shirts disposed on the surface of the cylindrical and conical portion of the container. In addition, the container is equipped with temperature, pressure and level sensors.

In the known apparatus, primary and secondary fermentation is carried out in different containers, and the finished beer is stored in a third container type.

SUMMARY OF THE INVENTION

It is an object of the invention to provide a method, apparatus and universal container for the natural carbonation of beverages, which process is technologically simplified and is without additional carbonation of the beverage with carbon dioxide, and the structure of the apparatus and the universal container allows both the completion of all stages of the beverage production and its storage until its full consumption.

The task is solved by the method of natural carbonation of beverages, which includes the operations: feeding the substrate for fermentation, addition of water, addition of yeast, fermentation of the resulting liquid mixture.

According to the invention the fermentation is carried out in a specialized container at an optimum temperature of 8° C. to 23° C., depending on the type of yeast. The fermentation process lasts for 3 to 4 days and is accompanied by an increase in container pressure to 2 bars. Additionally, the method also includes cooling the fermented liquid mixture from 23° C. to 12° C.-0° C.; saturation of the fermented liquid mixture with fermentation carbon dioxide.

In the preferred embodiment of the method, the specialized container is equipped with membrane expansion container.

The task is solved by having created an apparatus for naturally carbonated beverages comprising a container having a cylindrical body with a conical portion at one end. The container is equipped with temperature and pressure sensors. According to the utility model, the container is housed in a refrigeration chamber equipped with a double bottom in which a refrigeration unit is located. The conical part of the container is shaped like a truncated cone in whose small base is made the opening of the container. The opening of the container is closed by a lid. The temperature sensor is located at the bottom of the cylindrical body. The pressure sensor, which is a manometer, and an operating valve are located on the conical part of the container. A safety valve and a gas connection are also located on the conical part of the container. A nozzle for the liquids and a tap for draining the finished beverage are mounted at the bottom of the container body.

In the so created apparatus, the container is made of acid and alkali resistant steel. The task is solved by having created a universal container for naturally carbonated beverages mounted on a stand and including a cylindrical body with a conical part at one end. The container is equipped with an insulating jacket and a temperature maintaining system, as well as with temperature, pressure and level sensors.

According to the invention, the conical part is formed as a truncated cone whose small base is the opening of the container, which opening is closed by a lid provided with a spring-closing mechanism. The temperature maintaining system includes a unit located below the bottom of the container and a coil enclosing the cylindrical body above its bottom and placed under the insulating jacket. The temperature sensor and the level meter are located at the bottom of the cylindrical body. The pressure sensor is a pressure gauge connected to a service valve that is located on the cone of the container on which a safety valve is located. At the bottom of the cylindrical body are mounted a wash tap and a tap for draining the finished beverage. In the space below the bottom of the cylindrical body there is a membrane expansion container connected by means of a nozzle or flange with openings to one end of a tube. The other end of the tube is located in the conical portion of the container to make a connection between the two containers and ensure the circulation of the carbon dioxide released during the fermentation process.

The task is solved by creating another universal container for naturally carbonated beverages mounted on a stand and including a cylindrical body with a conical part at one end. The container is equipped with an insulating jacket and a temperature maintaining system, as well as with temperature, pressure and level sensors. According to the invention, the temperature maintaining system comprises a unit located below the bottom of the container and a coil which encloses the cylindrical body above its bottom and is disposed under the insulating jacket. The temperature sensor and the level meter are located at the bottom of the cylindrical body. The pressure sensor is a pressure gauge connected to a service valve that is located on the cone of the container on which a safety valve is located. At the bottom of the cylindrical body are mounted a wash tap and a tap for draining the finished beverage. The conical part of the container is formed as a truncated cone whose small base is connected by a flange with openings or a nozzle with a membrane expansion container. The expansion container is provided with a membrane insulating jacket, where an opening is formed on the cone portion of the container, closed by a lid provided with a spring-loaded closing mechanism.

The bottom of the universal containers may also be conical in shape and the level meter may be located on a window formed on its cylindrical body. The lids of the universal containers are also provided with an insulating casing. Universal containers are made of acid and alkali resistant steel and their membranes are made of ethylene propylene rubber (EPDM). The ratio of container diameter to height is from 1:0.3 to 1:1.99.

Advantages of the created method and facilities are that they allow the primary and secondary fermentation, as well as the maturing and storage of the beverage to its consumption, to take place in the same container. In addition, for the creation of a quality drink, no further carbonization is required, as it is naturally produced, retaining all the specific flavors and aromas. In the created universal containers, the drained volume is compensated by the membrane, and in the created apparatus the overpressure in the free portion of the container compensates for the drained volume and thus maintains the necessary overpressure so as not to degas the beverage.

BRIEF DESCRIPTION OF THE FIGURES

The present invention is illustrated with the accompanying drawings, wherein.

DETAILED DESCRIPTION OF EMBODIMENT OF THE INVENTION

In the inventive method of natural carbonation of beverages, the specialized container is charged with a fermentation substrate, which may be ready or concentrated, and water to be added to it. Yeast is added to the resulting liquid mixture. The yeast used may be for top or bottom fermentation. Depending on the yeast used, the optimal temperature regime for fermentation is also set. If top fermentation yeast is used, the optimum temperature is from 20° C. to 23° C. Upon the top fermentation, the yeast remains on the surface as foam after its completion. If yeast is used for lower fermentation, the optimal temperature is from 8° C. to 10° C. In this case, at the end of the fermentation, the yeast settles at the bottom of the container.

The fermentation process lasts 3-4 days, accompanied by pressure increase in the container to 2 bars. The subsequent operation of the method is to cool the fermented liquid mixture from 23° C. to 12° C.-0° C. As a result of the cooling, the absorption capacity of the fermented liquid mixture is increased in order to saturate it with carbon dioxide. In the case of using the universal containers, fermentation gases naturally carbonize the beverage, and the surplus fills the free volume of the expansion container and inflates the membrane. The membrane maintains pressure until the container is completely empty. In the case where the created apparatus is used, the fermented gases naturally carbonate the beverage, and the surplus fills the free volume of the container.

Figure 1:
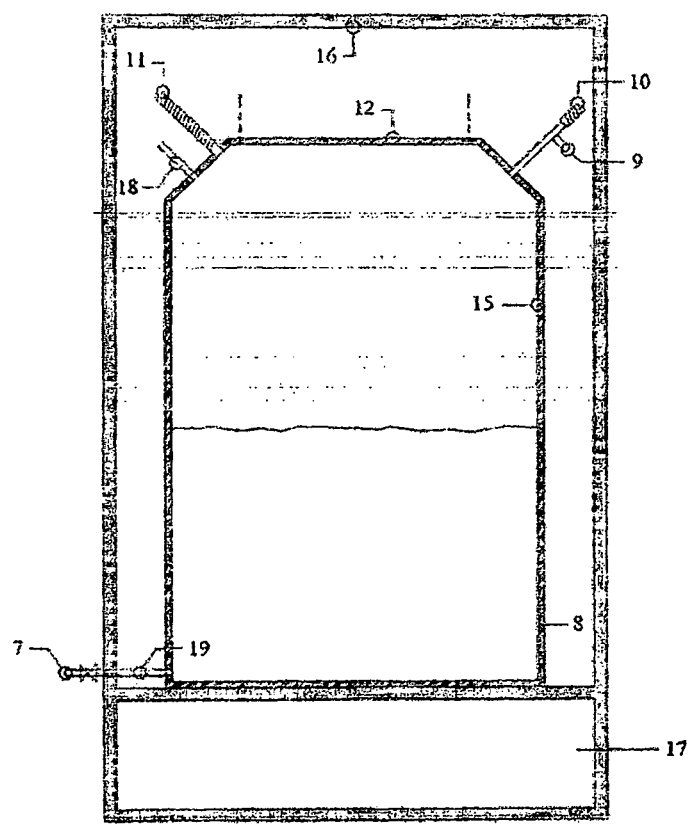
FIG. 1 is a schematic diagram of an apparatus for naturally carbonated beverages according to the invention.

FIG. 1 shows the apparatus for naturally carbonated beverages comprising a container 15 which is a cylindrical body with a conical portion at one end. The container 15 is made of acid and alkali resistant steel. The conical portion of the container 15 is formed as a truncated cone in small base of which an opening is formed in the container 15 which is closed by a lid 12. The container 15 is housed in a refrigeration chamber 16 provided with a double bottom 17 in which there is refrigeration aggregate. The container 15 is provided with temperature and pressure sensors. The temperature sensor 8 is located at the bottom of the cylindrical body of the container 15. The pressure meter, which is a pressure gauge 9, as well as an operating valve 10, are located on the conical part of the container 15, on which are also located a safety valve 11 and a gas orifice 18. A nozzle for liquids 19 and a drain tap 7 of the finished beverage are mounted at the bottom of the cylindrical body.

Figure 2:
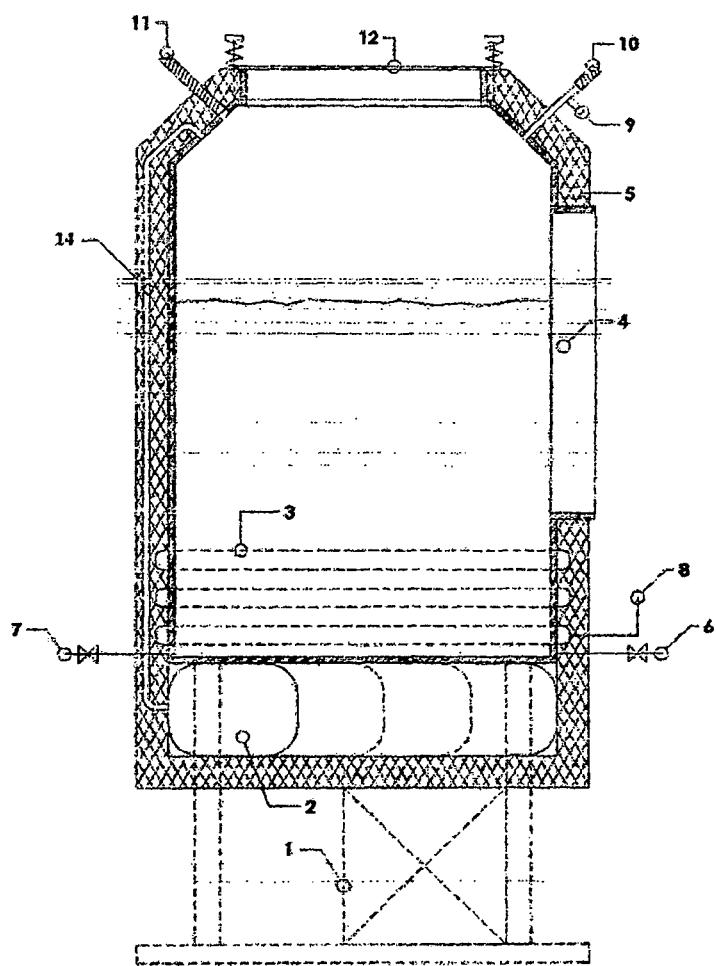
FIG. 2 is a first embodiment of the universal container according to the invention.

FIG. 2 shows the first embodiment of the universal container for naturally carbonated beverages mounted on a stand and comprising a cylindrical body and a conical portion at one end. The container is made of acid and alkali resistant steel. The conical part is formed as a truncated cone whose small base is the opening of the container. The container is provided with an insulating jacket 5 and a temperature maintaining system comprising the unit 1 and the coil 3. The unit 1 is located below the bottom of the container and the coil 3 encloses the cylindrical body above its bottom and is located under the insulating jacket 5. Furthermore, it is also equipped with temperature, pressure and level sensors. The temperature sensor 8 and the level meter 4 are located at the bottom of the cylindrical body. The pressure gauge is a manometer 9 connected to the operating valve 10 which is located on the conical portion of the container on which is located a safety valve 11.

A lower wash tap 6 and drain tap 7 of the finished beverage are provided at the bottom of the cylindrical body. In the space below the bottom of the cylindrical body there is a membrane expansion container 2 connected by means of a nozzle or flange with openings to one end of a tube 14. The other end of the tube 14 is located in the conical part of the container connecting the two containers and allowing the circulation of the carbon dioxide released during the fermentation process.

The open conical portion of the container is closed by a lid 12, also provided with an insulating jacket. The lid 12 is provided with a spring-loaded closing mechanism providing emergency pressure relief.

Figure 3:
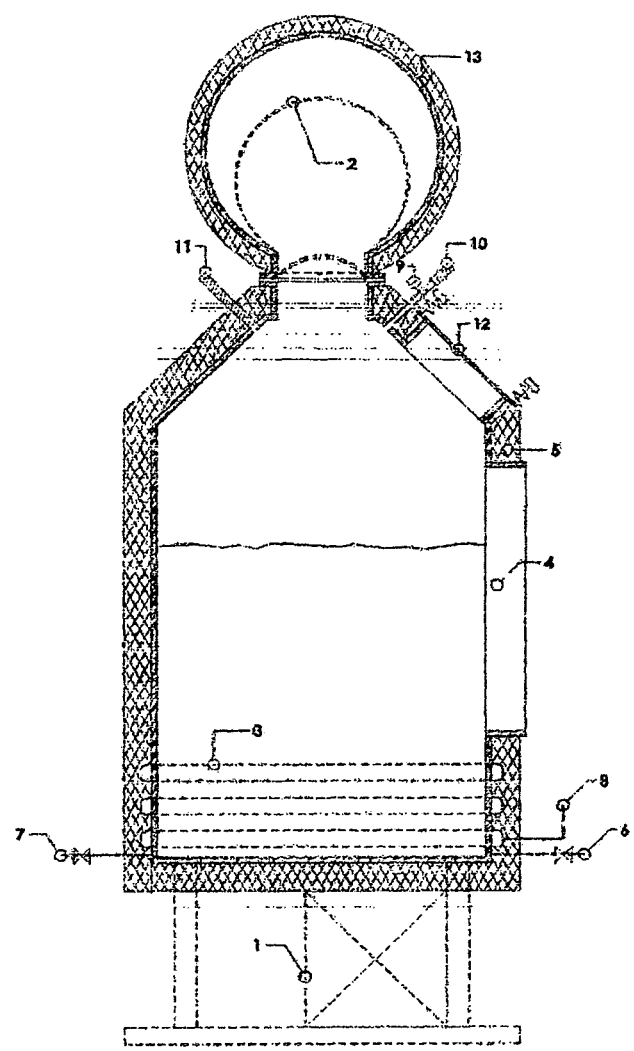
FIG. 3 is a second embodiment of the universal container according to the invention.

FIG. 3 shows a second embodiment of a universal container for naturally carbonated beverages mounted on a stand and constituting of cylindrical body with a conical portion at one end. The container is made of acid and alkali resistant steel. The container is provided with an insulating jacket 5 and a temperature maintaining system comprising the unit 1 and the coil 3. The unit 1 is located below the bottom of the container and the coil 3 comprises the cylindrical body above its bottom and is located under the insulating jacket 5. Furthermore, it is also equipped with temperature, pressure and level sensors. The temperature sensor 8 and the level meter 4 are located at the bottom of the cylindrical body. The pressure gauge is a manometer 9 connected to operating valve 10 which is located on the conical portion of the container on which is located a safety valve 11. Wash tap 6 and drain tap 7 of the finished beverage are provided at the low portion of the cylindrical body. The conical portion of the container is formed as a truncated cone whose small base is connected by a flange with openings or a nozzle with the membrane expansion container 2. The expansion container is provided with a membrane insulating jacket 13. A conical opening is formed on the conical portion of the container 12, also provided with an insulating jacket. The lid 12 is provided with a spring-loaded closing mechanism providing emergency pressure relief.

Optional embodiments of the two universal containers are possible where the bottom of the container may also be conical in shape, allowing for easier draining and washing of the container. The level meter 4 for both containers may be located on a window formed on the cylindrical body. The membrane 2 is made of ethylene propylene rubber (EPDM). The ratio of the container diameter to its height is from 1:0.3 to 1:1.99. The created containers for naturally carbonated beverages are used as follows.

The respective container is loaded with a fermentation substrate, which may be ready or concentrated. When concentrate is used, the required amount of water or condensate from the evaporation of the same substrate is added. Yeast is also added and, depending on the yeast used, an optimal fermentation temperature is set. If top fermentation yeast is used, the optimum temperature is from 20° C. to 23° C. In top the fermentation, the yeasts remain on the surface as foam after fermentation completion. If yeast is used for lower fermentation, the optimal temperature is from 8° C. to 10° C. During this fermentation at the end of the process the yeast is settled at the bottom of the container. The pressure in the container is set and maintained by the operating valve 10 and is within the range of 1 bar±20%, with excess gases being released into the atmosphere. The safety valve 11 operates at a pressure of 1.5 bar±10%.

When using universal containers, in case that the operating valve 10 and the safety valve 11 do not work, the emergency release of pressure is also effected by the spring mechanism of the lid 12. The fermentation gases in these cases naturally carbonate the beverage and the surplus fills the free volume of the container and inflates the membrane 2. The membrane 2 maintains overpressure until the container is completely empty.

When the natural carbonation apparatus is used, the emergency pressure relief is carried out by the safety valve 11 when the operating valve 10 is not operated. The fermentation gases, in this case, naturally carbonate the beverage and their excess fills the free volume of the container. The overpressure in the free portion of the container 15 compensates for the drained volume and thus maintains the necessary overpressure so as not to degas the beverage. The pressure is monitored by means of a manometer 9. The gas orifice 18 is used to add carbon dioxide from an external source.

In the specialized containers created for naturally carbonated beverages, carbonization is not needed as it is naturally produced. It is not necessary to add carbon dioxide to maintain excess pressure. Maturation and storage happen in the same container only by setting the optimal temperature. Stormy fermentation, quiet fermentation and storage to consumption also take place in the same container. Directly from the container, the drink is spilled for consumption by a drain tap.

The specialized containers can be used both for beer production and for the production of aerated wine, carbonated fruit drinks and others.

What is claimed is:

1. A method for natural carbonation of beverages comprising the operations:
    feeding with substrate for fermentation,
    addition of water,
    addition of yeast,
    fermentation of a resulting liquid mixture, characterized in that the fermentation is carried out in a container equipped with a membrane expansion container at an optimum temperature of 8° C. to 23° C. depending on the type of yeast, wherein the fermentation process lasts 3-4 days, accompanied by an increase in container pressure to 2 bar; wherein the method also includes
    cooling the fermented liquid mixture from 23° C. to at least between 12° C.-0° C.;
    saturation of the fermented liquid mixture with fermentation carbon dioxide.

2. An apparatus for naturally carbonated beverages for natural carbonation of beverages, comprising:
    a container having a cylindrical body with a conical portion at one end, the container being provided with temperature and pressure sensors, wherein the container is placed in a refrigeration chamber provided with a double bottom in which a refrigeration unit is provided, wherein the conical part of the container is formed as a truncated cone in whose small base the opening of the container is made, which opening is closed by a lid, the temperature sensor being located in the lower part of the cylindrical body and the pressure gauge comprising a manometer and operating valve are located on the conical part of the container, on which a safety valve and a gas orifice are located, and a nozzle for liquids and a drain tap for a finished beverage are mounted in the lower part of the cylindrical body of the container.

3. The apparatus according to claim 2, wherein the container is made of acid and alkali-resistant steel.

4. A container for naturally carbonated beverages mounted on a stand, container comprising:
    a cylindrical body and a conical portion at one end, the container being provided with an insulating jacket and a temperature maintaining system as well as temperature sensor, pressure gauge and level meter, wherein the conical part is formed as a truncated cone, the small base of which is the opening of the container, which opening is closed by a lid provided with a spring-closing mechanism, wherein the temperature maintaining system comprising an unit located below the bottom of the container and a coil surrounding the cylindrical body above its bottom and disposed under the insulating jacket, the temperature sensor and the level meter being located at the lower part of the cylindrical body, and the pressure gauge being a manometer is connected to an operating valve which is located on the cone portion of the container, on which a safety valve is provided, wherein in the lower part of the cylindrical body a wash tap and a drain tap are installed and in the space below the bottom of the cylindrical body there is an expansion container with a membrane connected by means of a nozzle or flange with openings to one end of a tube whose other end is located in the conical part of the container to make the connection between the two containers and ensuring the circulation of a carbon dioxide released during a fermentation process.

5. A container for naturally carbonated beverages for mounted on a stand container comprising:

a cylindrical body and a conical portion at one end, the container being provided with an insulating jacket and a temperature maintaining system as well as temperature sensor, pressure gauge and level meter, characterized in that the temperature maintaining system comprises a unit located below the bottom of the container and a coil surrounding the cylindrical body above its bottom, wherein the temperature sensor and the level meter are located in the lower part of the cylindrical body, and the pressure gauge, which is a manometer is connected to operating valve which is located on the conical part of the container, on which a safety valve is also provided, the lower part of the cylindrical body is fitted with a wash tap and a drain tap of a finished beverage, and the conical part of the container is formed as a truncated cone whose small base is connected by means of a flange with holes to an expansion container with a membrane expansion container, the expansion container being provided with a membrane insulating jacket, and the conical portion of the container has an opening, closed by a lid equipped with spring-loaded closing mechanism.

6. The universal container according to claim 5, wherein the bottom of the container can also be of a conical shape.

7. The container according to claim 5, wherein the level meter is located on a window formed on the cylindrical body.

8. The container according to claim 5, wherein the lid is also provided with an insulating jacket.

9. The container according to claim 5, wherein the container is made of acid and alkali resistant steel and the membrane is made of ethylene propylene rubber.

10. The container according to claim 5, wherein the ratio of the container diameter to its height is from 1:0.3 to 1:1.99.

* * * * *